(12) United States Patent
Ko et al.

(10) Patent No.: US 10,907,904 B2
(45) Date of Patent: Feb. 2, 2021

(54) MICROCHANNEL-TYPE ALUMINUM HEAT EXCHANGER AND METHOD OF MANUFACTURING THE SAME

(71) Applicant: SAMWON INDUSTRIAL CO., LTD., Gwangju (KR)

(72) Inventors: Jae Il Ko, Gwangju (KR); Young Bae Jang, Gwangju (KR); Chang Nam Han, Gwangju (KR); Ka Ram Lee, Gwangju (KR); Soon Ae Park, Gwangju (KR); Yong Guk Heo, Gwangju (KR)

(73) Assignee: SAMWON INDUSTRIAL CO., LTD., Gwangju (KR)

( * ) Notice: Subject to any disclaimer, the term of this patent is extended or adjusted under 35 U.S.C. 154(b) by 56 days.

(21) Appl. No.: 16/464,837

(22) PCT Filed: Jul. 3, 2017

(86) PCT No.: PCT/KR2017/007035
§ 371 (c)(1),
(2) Date: May 29, 2019

(87) PCT Pub. No.: WO2018/101563
PCT Pub. Date: Jun. 7, 2018

(65) Prior Publication Data
US 2019/0293355 A1      Sep. 26, 2019

(30) Foreign Application Priority Data

Nov. 30, 2016   (KR) ........................ 10-2016-0161882
Jun. 26, 2017   (KR) ........................ 10-2017-0080512

(51) Int. Cl.
*F28D 7/00*   (2006.01)
*F28D 7/02*   (2006.01)
(Continued)

(52) U.S. Cl.
CPC ................ *F28D 7/024* (2013.01); *B23K 1/00* (2013.01); *F28D 1/02* (2013.01); *F28D 1/047* (2013.01);
(Continued)

(58) Field of Classification Search
CPC . F28D 7/024; F28D 1/02; F28D 1/047; F28D 21/00; B23K 1/00; F28F 1/12;
(Continued)

(56) References Cited

U.S. PATENT DOCUMENTS 5,806,585 A *    9/1998 Yoshida .................. F25B 39/00
                                                   165/171
2003/0102112 A1* 6/2003 Smithey .................. F28F 1/126
                                                   165/150

(Continued)

FOREIGN PATENT DOCUMENTS

JP      H11281291      10/1999
KR      20010015060    2/2001
KR      20040051643    6/2004

*Primary Examiner* — Davis D Hwu
(74) *Attorney, Agent, or Firm* — IPLA P.A.; James E. Bame

(57) ABSTRACT

A microchannel-type aluminum heat exchanger and a method of manufacturing the same, in which a heat-exchange tube is of a microchannel-type so as to improve the efficiency of heat exchange and the microchannel-type heat-exchange tube is wound in a coil-spring shape so as to reduce the volume thereof and the area required for installation, compared to a conventional heat exchanger, thereby improving utilization of space, and in which the heat exchanger, which is composed of the coil-spring-shaped heat-exchange tube, is not provided with a header in order to simplify the structure thereof, thereby improving productivity and economic efficiency owing to reduced manufacturing costs.

3 Claims, 9 Drawing Sheets

(51) Int. Cl.

| | | |
|---|---|---|
| *F28F 1/12* | (2006.01) | |
| *F28F 21/08* | (2006.01) | |
| *F28D 21/00* | (2006.01) | |
| *B23K 1/00* | (2006.01) | |
| *F28F 13/12* | (2006.01) | |
| *F28D 1/02* | (2006.01) | |
| *F28D 1/047* | (2006.01) | |
| *F28F 1/42* | (2006.01) | |

(52) U.S. Cl.
CPC ............... *F28D 21/00* (2013.01); *F28F 1/12* (2013.01); *F28F 1/126* (2013.01); *F28F 13/12* (2013.01); *F28F 21/08* (2013.01); *F28F 21/084* (2013.01); *F25B 2500/01* (2013.01); *F28F 2001/428* (2013.01); *F28F 2215/10* (2013.01); *F28F 2260/02* (2013.01); *F28F 2275/06* (2013.01); *Y02P 70/10* (2015.11)

(58) Field of Classification Search
CPC .. F28F 1/126; F28F 13/12; F28F 21/08; F28F 21/084; F28F 2001/428; F28F 2215/10; F28F 2260/02; F28F 2275/06; Y02P 70/10; F25B 2500/01
USPC ........................................................ 165/186
See application file for complete search history.

(56) References Cited

U.S. PATENT DOCUMENTS

| | | | | |
|---|---|---|---|---|
| 2007/0125528 | A1* | 6/2007 | Fakheri | ................ F28D 1/024 165/163 |
| 2013/0228321 | A1* | 9/2013 | Williams | ............... B21D 11/06 165/183 |
| 2017/0074600 | A1* | 3/2017 | Gao | .......................... F28F 1/36 |

* cited by examiner

MICROCHANNEL-TYPE ALUMINUM HEAT EXCHANGER AND METHOD OF MANUFACTURING THE SAME

BACKGROUND

The present invention relates to a microchannel-type aluminum heat exchanger, and more particularly to a microchannel-type aluminum heat exchanger and a method of manufacturing the same, in which a microchannel-type heat-exchange tube is wound in a coil-spring shape so as to improve the efficiency of heat exchange even without having a header and in which the heat exchanger is not provided with a header for simplification of a structure thereof so as to improve productivity and to improve economic efficiency owing to reduced manufacturing costs.

In general, a refrigerator includes a refrigerating cycle in which a compressor for compressing a gas phase refrigerant into a high-temperature and high-pressure refrigerant so as to provide circulating force, a capillary tube for performing heat exchange (heat dissipation) with external air and for changing the phase of the pressurized refrigerant into a low-temperature and low-pressure phase therethrough and an evaporator for performing heat exchange (heat absorption) with the low-temperature and low-pressure refrigerant flowing therethrough so as to change the phase of the refrigerant into a gas phase and for sending the refrigerant to the compressor are cyclically connected to one another.

Among the components constituting the refrigerating cycle, each of the condenser and the evaporator is provided with a heat exchanger adapted to absorb heat from the refrigerant while forcibly circulating external air and to dissipate the heat to the outside. The heat exchanger may be configured to have various structures and shapes according to the purpose of installation thereof. Among the available kinds of heat exchanger, a microchannel-type heat exchanger and a fin-tube-type heat exchanger, which are designed for efficient heat exchange, are extensively used.

As a related art relating to the microchannel-type heat exchanger, a heat exchanger composed of a spiral microchannel tube is disclosed in Korean Patent Registration Publication No. 10-0540811.

The microchannel-type heat exchanger, disclosed in the above Patent Registration Publication, includes headers each serving as a passage through which a refrigerant flows, a tube having hollow microchannels therein, which is wound in a spiral shape and is connected to the headers so as to allow the refrigerant flowing therethrough to dissipate heat, and a plurality of fins fixed to the tube so as to increase an area for heat dissipation.

However, because the heat exchanger of the above patent is constructed such that the ends of the tube are fixed by a pair of headers, there is a problem whereby the structure is complicated, thereby deteriorating operating efficiency and productivity.

In addition, because the headers have to be manufactured by subjecting a raw material to a large number of processes such as a pipe-making process and a press process, there is a problem whereby manufacturing costs are increased and thus economic efficiency is decreased.

SUMMARY OF THE INVENTION

Therefore, the present invention has been made in view of the above problems, and it is an object of the present invention to provide a microchannel-type heat exchanger in which a microchannel-type heat-exchange tube is wound in a coil-spring shape so as to improve the efficiency of heat exchange even without having a header.

Another object of the present invention is to provide a microchannel-type heat exchanger, which is not provided with a header for simplification of structure a structure thereof so as to improve productivity and to improve economic efficiency owing to a reduction in manufacturing costs.

In accordance with an aspect of the present invention, the above and other objects can be accomplished by the provision of a microchannel-type aluminum heat exchanger including a heat-exchange tube, which is wound in a coil-spring shape such that adjacent planar portions thereof face each other, a heat-exchange thin plate, which is composed of a thin Al-3xxx series plate and thin Al-4xxx series plates bonded to opposite surfaces of the thin Al-3xxx series plate, a heat-exchange strip, which is prepared by cutting the heat-exchange thin plate to a predetermined length and forming a plurality of air vent holes in the cut heat-exchange thin plate, and a heat-exchange fin, which is repeatedly bent and extends along the length of the heat-exchange strip, wherein the heat-exchange fin is disposed between the adjacent planar portions of the heat-exchange tube and is fused to surfaces of the planar portions of the heat-exchange tube by melting the thin Al-4xxx series plates which constitutes the heat-exchange fin.

The thin Al-3xxx series plate may have a melting point of 650-655° C., and the thin Al-4xxx series plates may have a melting point of 570-630° C.

The heat-exchange thin plate may be cut such that the cut heat-exchange thin plate has a width that is equal to or greater than a width W of the planar portions of the heat-exchange tube.

The plurality of air vent holes may be formed in one side or both sides of the heat-exchange thin plate about a central line of a width W1 of the heat-exchange thin plate in a width direction.

The heat-exchange strip may be bent so as to have a height T, which corresponds to a vertical distance between the adjacent planar portions of the heat-exchange tube.

In accordance with another aspect of the present invention, there is provided a method of manufacturing a microchannel-type aluminum heat exchanger including providing a heat-exchange tube, which is wound in a coil-spring shape such that adjacent planar portions thereof face each other, bonding thin Al-4xxx series plates to opposite sides of a thin Al-3xxx series plate so as to form a heat-exchange thin plate, cutting the heat-exchange thin plate to a predetermined length, repeatedly bending the heat-exchange strip along a length thereof so as to form a heat-exchange fin, disposing the heat-exchange fin between the adjacent planar portions of the heat-exchange tube and heating and melting the thin Al-4xxx series plates so as to fuse the thin plates to surfaces of the planar portions of the heat-exchange tube, and respectively connecting a refrigerant inlet pipe and a refrigerant outlet pipe to two ends of the heat-exchange tube, to which the heat-exchange fin has been fused.

The thin Al-3xxx series plate may have a melting point of 650-655° C., and the thin Al-4xxx series plates may have a melting point of 570-630° C.

The heat-exchange thin plate may be cut such that the cut heat-exchange thin plate has a width that is equal to or greater than a width W of the planar portions of the heat-exchange tube.

Cutting the heat-exchange thin plate to a predetermined length may include forming a plurality of air vent holes in the cut heat-exchange thin plate, and the plurality of air vent holes may be formed in one side or both sides of the heat-exchange thin plate about a central line of a width W1 of the heat-exchange thin plate in a width direction.

The heat-exchange strip may be bent so as to have a height T, which corresponds to a vertical distance between the adjacent planar portions of the heat-exchange tube.

According to the present invention, the heat-exchange tube is of a microchannel-type so as to improve the efficiency of heat exchange and the microchannel-type heat-exchange tube is wound in a coil-spring shape so as to reduce the volume thereof and thus the area required for installation, compared to a conventional heat exchanger, thereby improving efficiency of utilization of space.

Furthermore, according to the present invention, the heat exchanger, which is composed of the coil-spring-shaped heat-exchange tube, is not provided with a header in order to simplify the structure thereof, thereby improving productivity and economic efficiency owing to reduced manufacturing costs.

DETAILED DESCRIPTION OF THE INVENTION

Hereinafter, exemplary embodiments of the present invention will be described in detail with reference to the accompanying drawings such that the invention can be easily embodied by one of ordinary skill in the art to which this invention belongs. However, the present invention is not limited to the embodiments disclosed hereinafter, but may be embodied in different modes.

Figure 1:
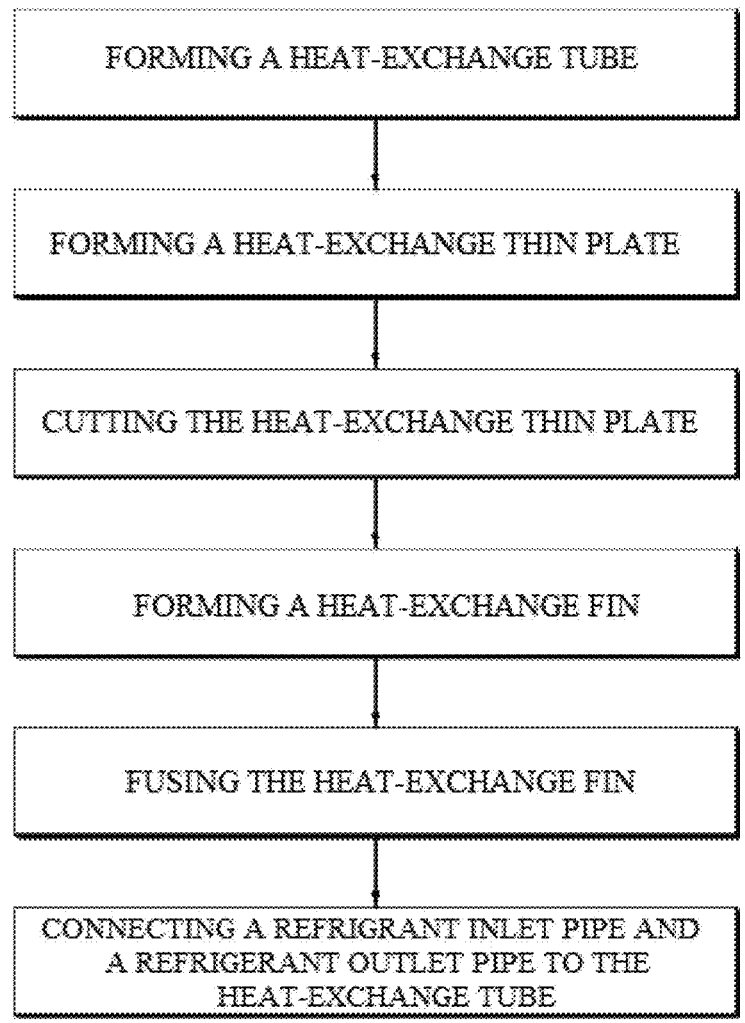
FIG. 1 is a flowchart illustrating a process of manufacturing a microchannel-type aluminum heat exchanger according to the present invention.
Figure 2:
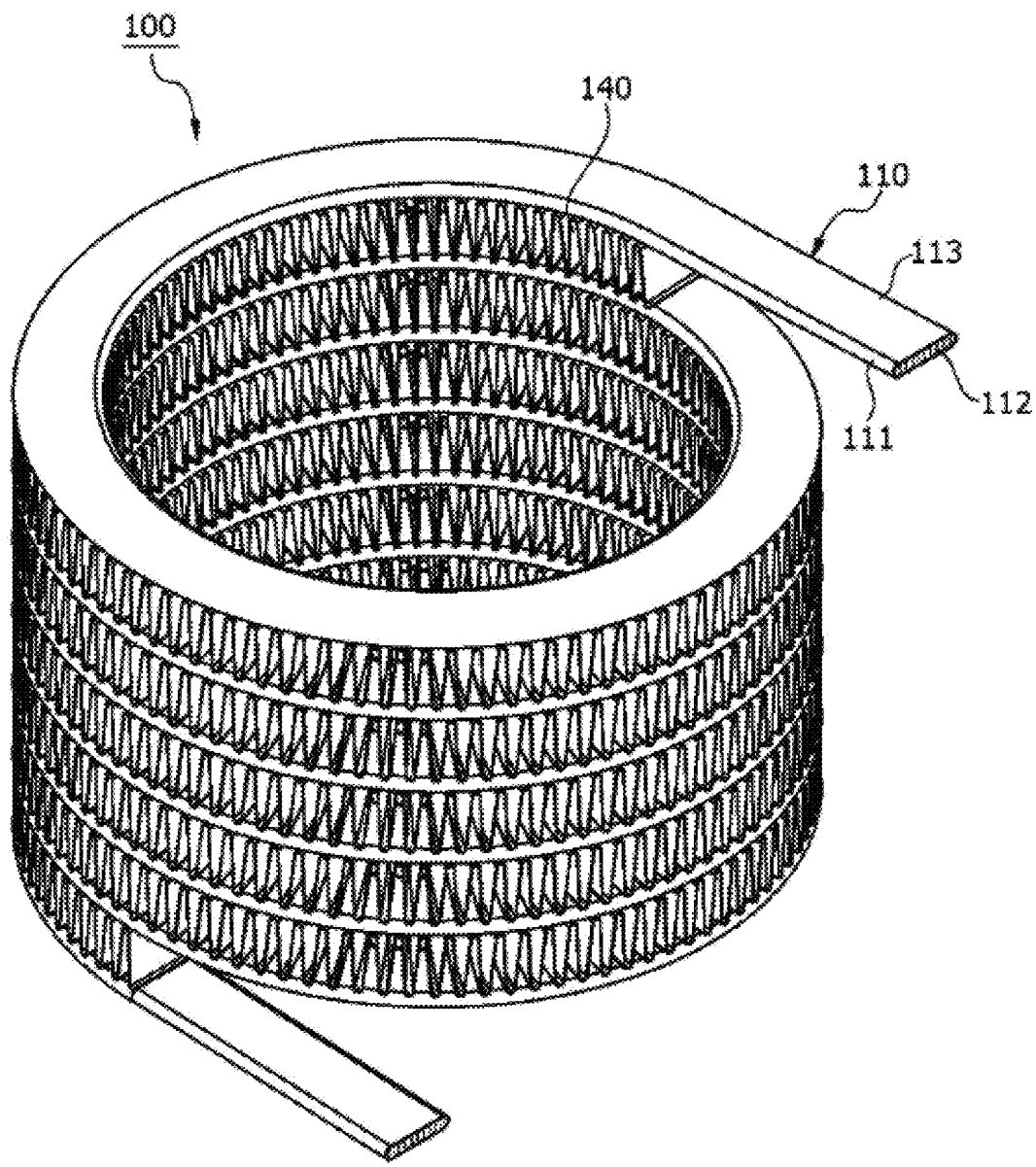
FIG. 2 is a perspective view illustrating the microchannel-type aluminum heat exchanger according to the present invention.
Figure 3:
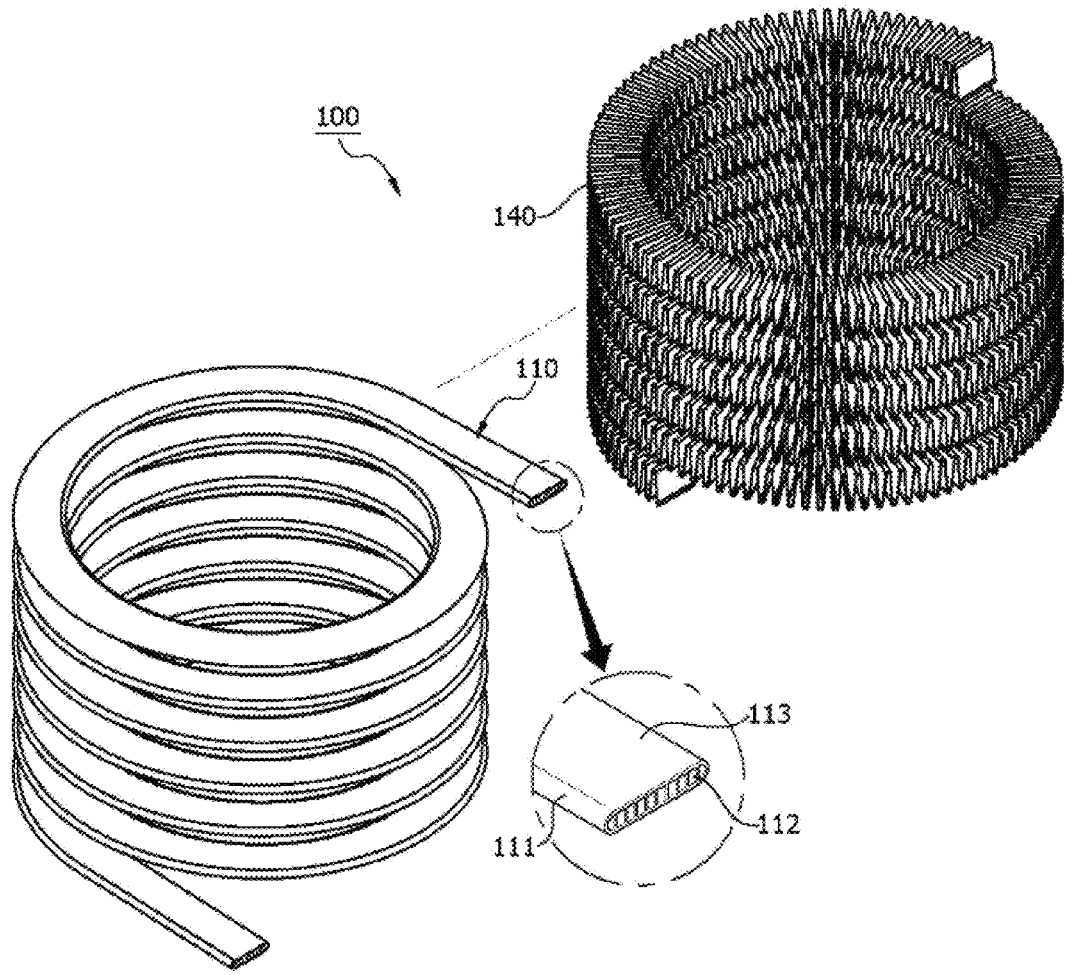
FIG. 3 is an exploded perspective view of FIG. 2.
Figure 4:
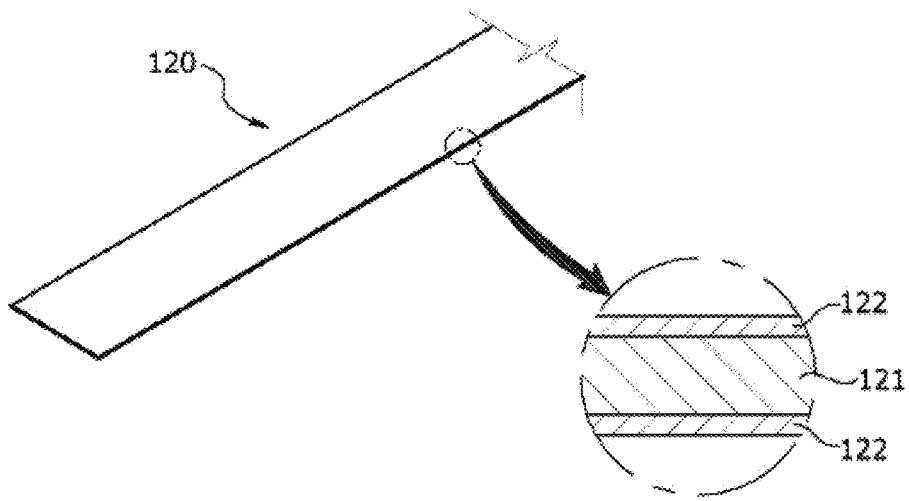
FIG. 4 is a perspective view illustrating a heat-exchange thin plate to which the present invention is applied.
Figure 5:
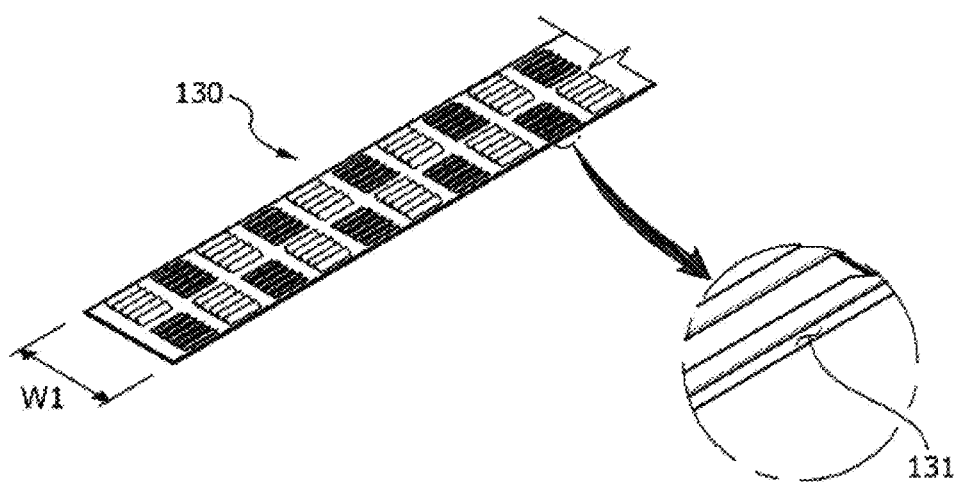
FIG. 5 is a perspective view illustrating a heat-exchange strip to which the present invention is applied.

FIG. 1 is a flowchart illustrating a process of manufacturing a microchannel-type aluminum heat exchanger according to the present invention. FIG. 2 is a perspective view illustrating the microchannel-type aluminum heat exchanger according to the present invention. FIG. 3 is an exploded perspective view of FIG. 2. FIG. 4 is a perspective view illustrating a heat-exchange thin plate to which the present invention is applied. FIG. 5 is a perspective view illustrating a heat-exchange strip to which the present invention is applied.

The microchannel-type aluminum heat exchanger 100 according to the present invention includes a heat-exchange tube 110, a heat-exchange thin plate 120, a heat-exchange strip 130 and a heat-exchange fin 140.

The heat-exchange tube 110 is composed of a flat body 111, which is provided therein with microchannels 112 through which a heat-exchange medium flows, and which is wound in a coil-spring shape such that planar portions thereof face each other.

The heat-exchange thin plate 120 is prepared by physically bonding a thin Al-3xxx series plate 121 to thin Al-4xxx series plates 122.

Preferably, the thin Al-3xxx series plate 121 has a melting point of 650-655° C., and the thin Al-4xxx series plates 122 have a melting point of 570-630° C.

The heat-exchange strip 130 is prepared by cutting the heat-exchange thin plate 120 to a predetermined length. The heat-exchange thin plate 120 is cut such that the width thereof is equal to or greater than the width W of the planar portion 113 of the heat-exchange tube 110.

The cut heat-exchange thin plate 120 is formed with an air vent hole 131. The air vent hole 131 includes a plurality of air vent holes 131, which are arranged at one side or both sides of the heat-exchange fin 140 about the central line of the width W1 of the heat-exchange fin 140 in the width direction.

The heat-exchange fin 140 extends endlessly from the starting point to the ending point of the heat-exchange tube 110 between the planar portions of the heat-exchange tube 110 without interruption therein, and is secured to the planar portions 113. Preferably, the heat-exchange fin 140 is configured to have a corrugated shape or a zigzag shape.

Figure 6:
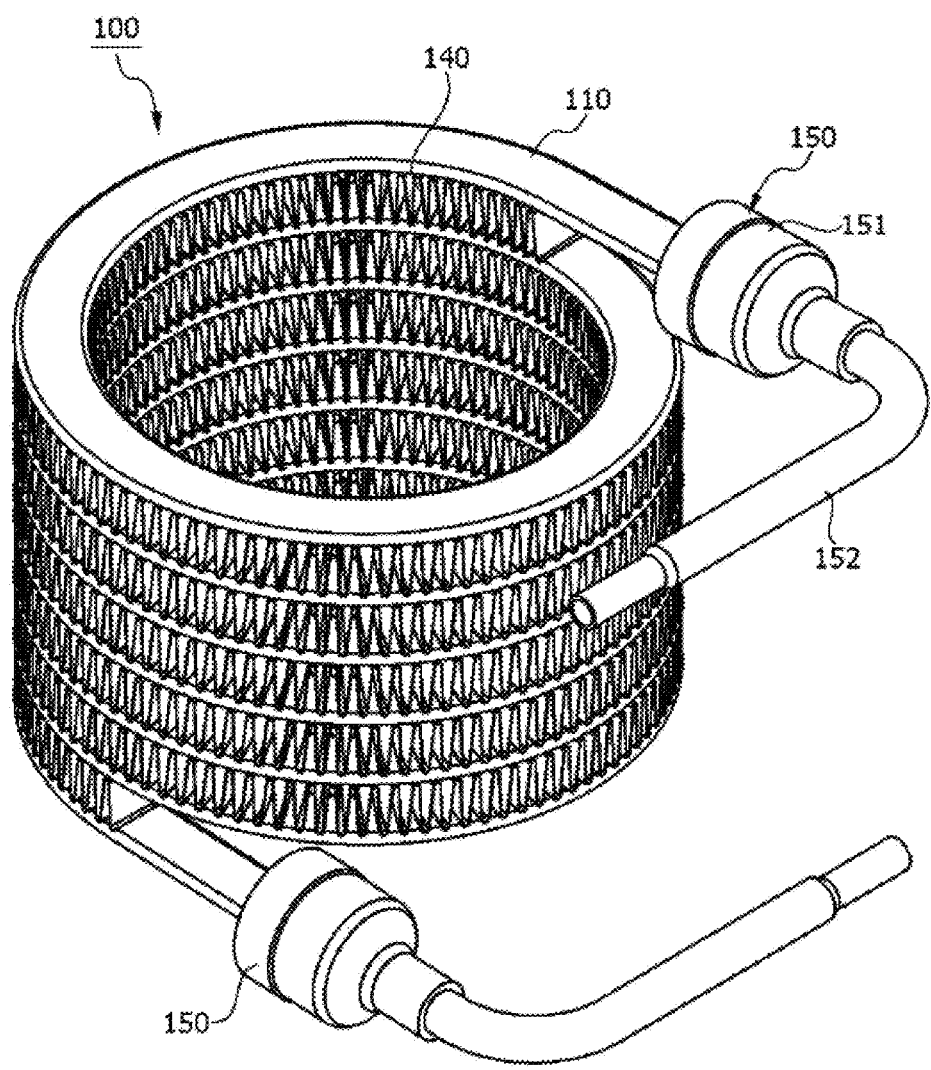
FIG. 6 is a perspective view illustrating an embodiment of the present invention in which refrigerant pipes are connected to the two ends of the heat-exchange tube.

As illustrated in FIG. 6, the heat-exchange tube 110 is provided at the two ends thereof with refrigerant pipes 150 secured thereto, through which the heat-exchange medium is introduced into and discharged from the heat exchanger 100.

The refrigerant pipes 150 includes a refrigerant inlet pipe 151, which is connected to one end of the heat-exchange tube 110 so as to allow the heat-exchange medium to be supplied to the heat-exchange tube 110 therethrough, and a refrigerant outlet pipe 152, which is connected to the other end of the heat-exchange tube 110 so as to allow the heat-exchange medium to be discharged from the heat-exchange tube 110 therethrough.

The refrigerant inlet pipe 151 functions to guide the high-temperature and high-pressure heat-exchange medium, which is supplied from a compressor, toward the heat-exchange tube 110, and the refrigerant outlet pipe 152 functions to guide the heat-exchange medium, which has been changed to the state of low-temperature and low-pressure while flowing through the heat-exchange tube 110, so as to be discharged toward an expansion valve.

The present invention is able not only to allow the heat-exchange medium to be smoothly introduced and discharged through the refrigerant pipe 150 but also to be easily and reliably connected between the compressor and the expansion valve, thereby preventing leakage of the heat-exchange medium.

An operation of manufacturing the heat exchanger according to the present invention, which is constructed in the above-described way, will now be described.

First, the flat body 111, which is provided therein with the microchannels 112 so as to allow the heat-exchange medium to flow therethrough, is wound in a coil-spring shape from the one end to the other end thereof by means of a typical winding device such that the adjacent planar portions 113 face each other (ST1).

Here, it goes without saying that the heat-exchange tube 110, which is wound in the coil-spring shape, must have a uniform curvature.

Then, the thin Al-3xxx series plate 121 and the thin Al-4xxx series plates 122 are physically bonded to each other, thereby forming the heat-exchange thin plate 120 (ST2).

Then, the heat-exchange thin plate 120 is cut such that the width thereof is equal to or greater than the width W of the planar portion 113 of the heat-exchange tube 110 (ST3).

The cut heat-exchange thin plate, which has been cut to a predetermined length, is formed with the plurality of air vent holes, which are arranged at one side or both sides of the heat-exchange thin plate about the central line of the width W1 of the heat-exchange thin plate in the width direction.

Then, the heat-exchange strip 130 is repeatedly bent along the length thereof in a corrugated shape or a zigzag shape, thereby forming the heat-exchange fin 140 (ST4). The heat-exchange strip 130 is bent so as to have a height T, which corresponds to the vertical distance between the adjacent planar portions 113 of the heat-exchange tube 110. Consequently, the resultant heat-exchange fin 140 is disposed between the adjacent planar portions 113 of the heat-exchange tube 110 and coupled thereto from the starting point to the ending point of the heat-exchange tube 110.

The heat-exchange tube 110, in which the heat-exchange fin 140 is disposed between the adjacent planar portions 113 and coupled thereto, is heated to a temperature of 570-630° C. in order to melt the thin Al-4xxx series plates 122 of the heat-exchange thin plate 120 such that the thin plates 122 are securely fused to the surfaces of the planar portions 113 of the heat-exchange tube 110 (ST5).

The reason why the thin Al-4xxx series plates 122 and the thin Al-3xxx series plate 121, which constitute the heat-exchange thin plate 120, are physically bonded to each other is to enable the thin Al-4xxx series plates 122 to serve as a cladding so as to securely and uniformly fuse the heat-exchange fin 140 to the heat-exchange tube 110 when the heat-exchange fin 140 is brazed at a temperature such that the thin Al-4xxx series plates 122 is melted but the thin Al-3xxx series plate 121 is not melted in the state in which the heat-exchange fin 140 is disposed between the planar portions 113 of the heat-exchange tube 110. Here, a thin Al-3003-series plate may be used as the thin Al-3xxx series plate 121, and a thin Al-4343 series plates may be used as the thin Al-4xxx series plates 122.

Subsequently, the refrigerant inlet pipe 151 and the refrigerant outlet pipe 152 are respectively coupled to the two ends of the heat-exchange tube 110, which includes the heat-exchange fin 140 fused thereto (ST6). As a result, the operation of manufacturing the heat exchanger 100 according to the present invention is finished.

Through the above manufacturing process, the heat-exchange tube 110 and the heat-exchange fin 140 of the heat exchanger 100 are not only rapidly and uniformly manufactured but also securely coupled to each other, thereby reducing manufacturing costs by virtue of mass production of products and improving production efficiency.

In addition, since the heat-exchange tube 110, which is prepared in a microchannel type, is wound in a coil-spring shape so as to form a cylindrical form, and is provided on the upper and low surfaces thereof with the heat-exchange fin 140 having a corrugated shape or a zigzag shape, it is possible to reduce the volume of the heat exchanger and thus the area required to install the heat exchanger, thereby improving space efficiency, compared to a conventional heat exchanger. In addition, since heat exchange between the heat-exchange tube 110 and the heat-exchange medium flowing therethrough is rapidly and uniformly achieved, it is possible to improve the efficiency of heat exchange. Furthermore, since the durability of the heat-exchange tube 110 is improved, it is possible to prevent deformation of the heat exchanger 100 and leakage of the heat-exchange medium.

Figure 7:
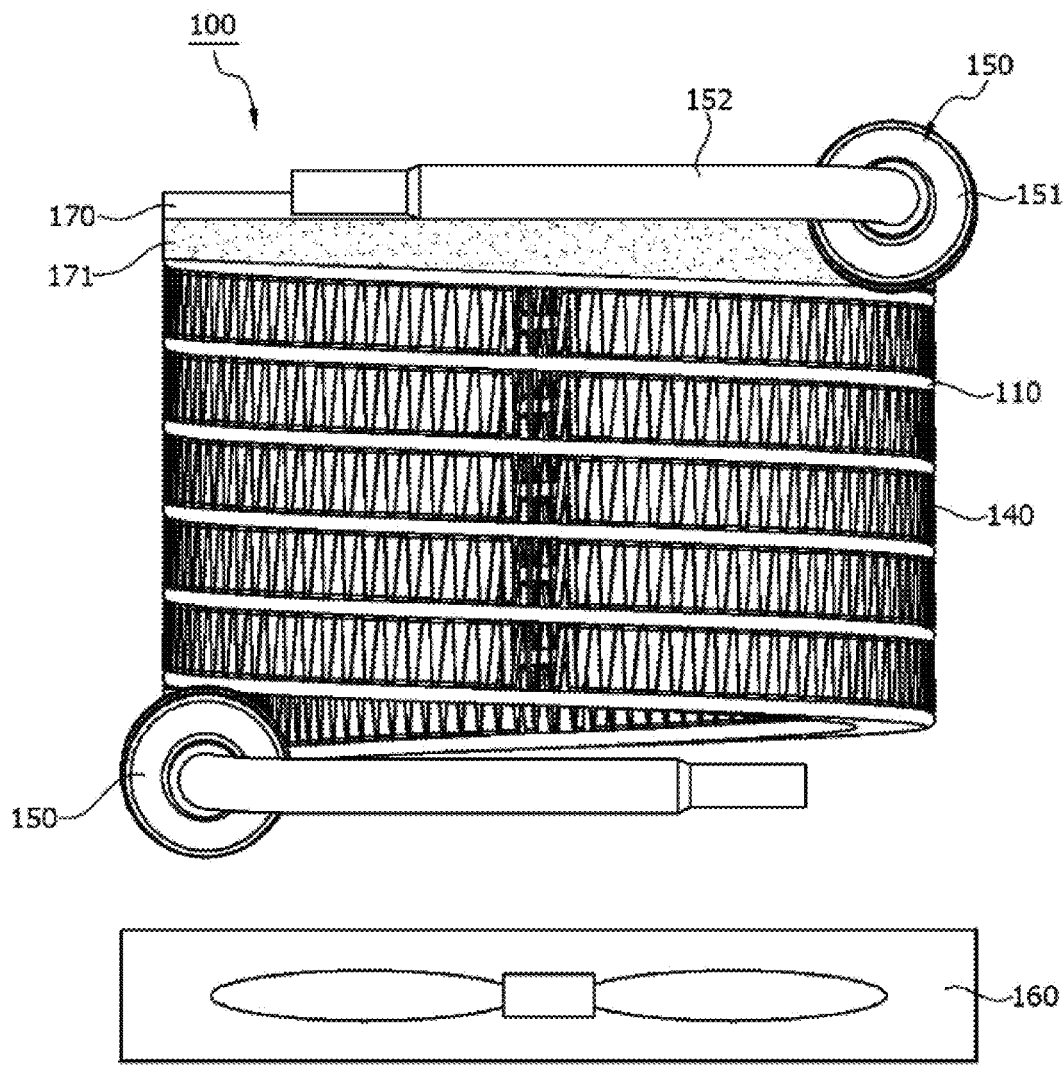
FIG. 7 is a view illustrating the heat exchanger according to the present invention, the two end openings of which are respectively provided with a rotating fan and a closing member.

When the heat exchanger 100, which has been manufactured in the above-described way, is mounted on a cooling apparatus, a rotating fan 160 is provided at one of opposite openings wkrin the heat exchanger 100 while a closing member 170 is provided at the other of the opposite openings so as to prevent air from being introduced through spaces other than the space in which the heat-exchange fin 140 is mounted, as illustrated in FIG. 7.

Here, the closing member 170 may be configured to have a plate shape so as to prevent an increase in the volume of the heat exchanger 100. The spacing defined between the closing member 170 and the heat exchanger 100 may be blocked by mounting an additional sealing member 171.

As the sealing member 171, a urethane material, a sponge material or the like may be used. As long as the material is not deformed at a temperature of 80° C. or lower, any material may be used.

As means for attaching the closing member 170 to the other opening of the heat exchanger 10, any one selected from among attachment by means of an adhesive, welding, riveting, a screw and a bracket may be applied. The means for attaching the closing member 170 may be appropriately selected and used depending on the material of the closing member 170 and the sealing member 171.

After the heat exchanger 100, which has been manufactured through the above process, is positioned in place at a desired site, the refrigerant inlet pipe 151 and the refrigerant outlet pipe 152 of the refrigerant pipe 150 are respectively connected to the compressor and the expansion valve via connecting tubes, through which the heat-exchange medium flows. As a result, the high-temperature and high-pressure heat-exchange medium, which is supplied from the compressor, may be smoothly supplied into the heat-exchange tube 110, and then the heat-exchange medium, which has exchanged heat with the heat-exchange tube 110 while flowing through the heat-exchange tube 110, may be smoothly discharged to the expansion valve, thereby allowing rapid heat exchange therebetween. Accordingly, the heat exchanger 100 may be easily and securely coupled to the connecting tubes, which are respectively connected to the compressor and the expansion valve.

Figure 8:
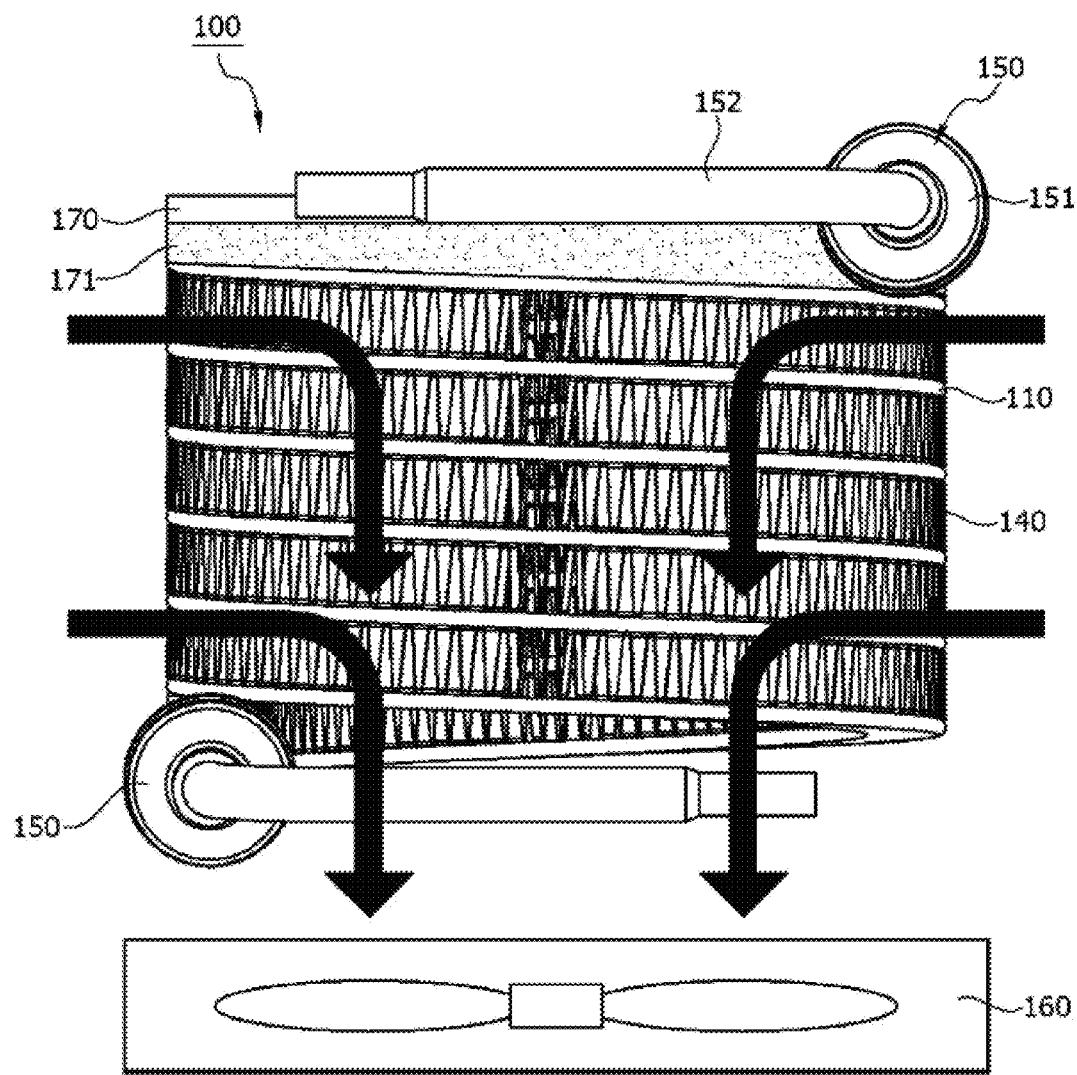
FIG. 8 is a schematic view illustrating the heat exchanger according to the present invention in which external air is introduced into the central part of the heat exchanger through a heat-exchange fin in the state in which the rotating fan and the closing member are mounted on the heat exchanger, thereby performing heat exchange.

The heat, which is generated from the heat exchanger 100 while the heat-exchange medium flows through the refrigerant inlet pipe 151 and the refrigerant outlet pipe 152, is introduced into the central part of the heat-exchange tube 110, which is configured in a coil-spring shape, due to the suction force, which is generated by operation of the rotating fan 160, as illustrated in FIG. 8.

At this time, since the other opening in the heat exchanger 100 is provided with the closing member 170, air is uniformly introduced into the heat exchanger 100 from all directions through the air vent holes 131 formed in the heat-exchange fin 140, thereby performing heat exchange.

If the other opening in the heat exchanger 100 is not blocked by the closing member 170, air is intensively introduced, due to the action of the rotating fan 160, into the heat exchanger 100 through the other opening, which is opposite the one opening in which the rotating fan 160 is provided. Consequently, the amount of air that flows through the heat-exchange fin 140 is significantly reduced, and thus uniform heat exchange with the heat-exchange medium flowing through the heat-exchange tube 110 is not achieved, thereby decreasing the efficiency of heat exchange of the heat exchanger 100.

Figure 9:
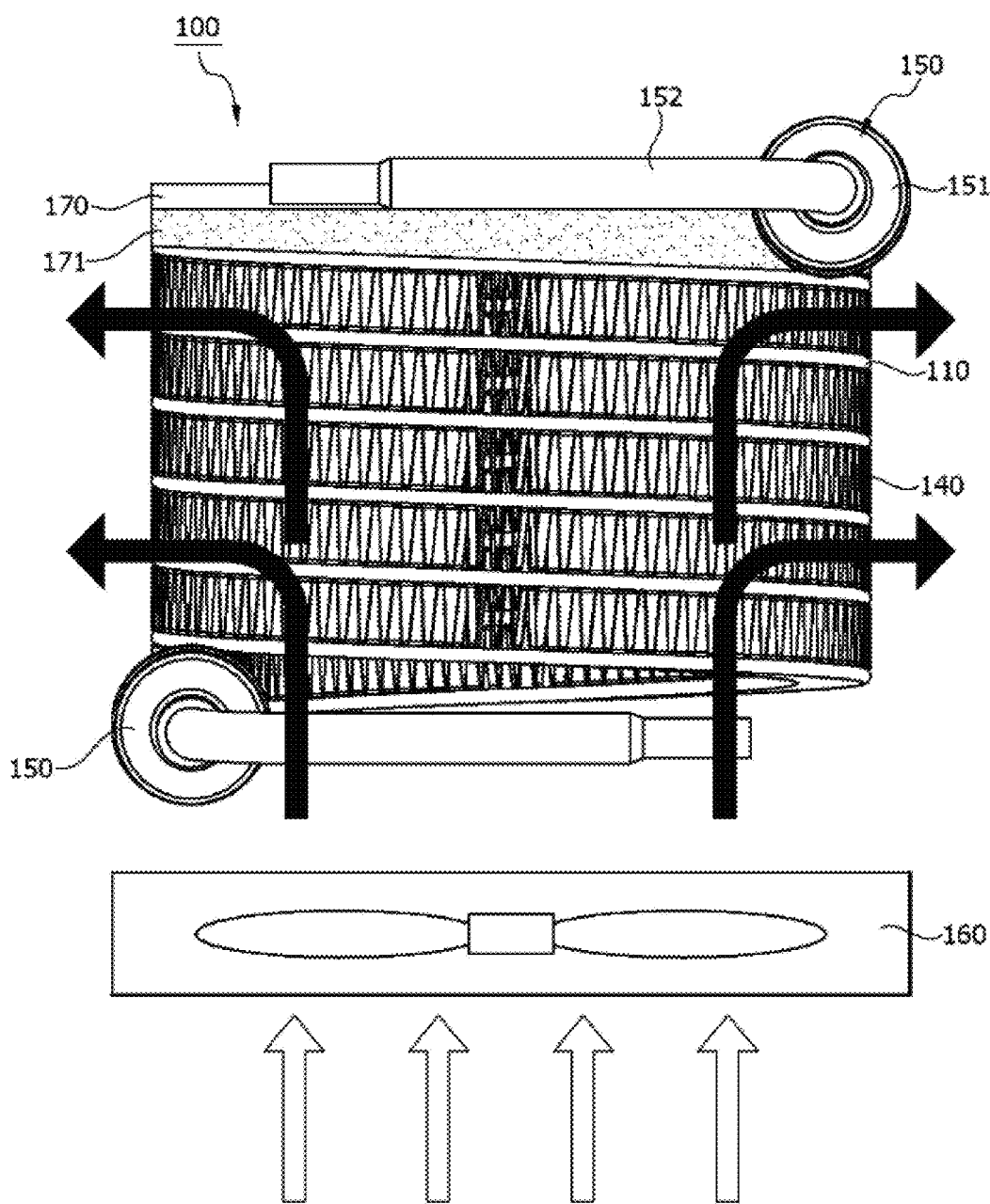
FIG. 9 is a schematic view illustrating the heat exchanger according to the present invention in which external air supplied to the central part of the heat exchanger is discharged to the outside through the heat-exchange fin in the state in which the rotating fan and the closing member are mounted on the heat exchanger, thereby performing heat exchange.

Although the rotating fan 160 is shown as being provided so as to cause air to be introduced into the central part in the heat-exchange tube 110, the rotating fan 160 may be otherwise provided so as to cause air to be sucked through the rotating fan 160 and then to be supplied to the central part in the heat-exchange tube 110, as illustrated in FIG. 9. In this case, since the other opening that is opposite the rotating fan 160 is blocked by the closing member 170, the air, which is supplied to the central part in the heat-exchange tube 110, is uniformly discharged to the outside through the heat-exchange fin 140 throughout the outer surface of the heat exchanger 100, thereby increasing the efficiency of heat exchange.

Here, the air vent holes 131 formed in the heat-exchange fin 140 are arranged in multiple rows at opposite sides of the heat exchanger strip 130 such that the air vent holes 131 formed at opposite lateral sides are directed to the central line of the heat-exchange strip 130. Accordingly, air that passes through the air vent holes 131 in opposite lateral sides converges, thereby creating turbulent flow. Accordingly, rapid heat exchange between the air and the heat-exchange medium is achieved, and thus efficiency of heat exchange is improved.

Hereinafter, the heat exchanger 100, which is manufactured in the above-described manner, will be described in more detail with reference to experimental examples.

Experimental Example 1: Texture Test for Heat Exchanger 100

In order to test changes in the texture of the heat exchanger 100 having a predetermined curvature when the heat-exchange tube 110 is formed in a cylindrical coil-spring shape, the crystal orientation and the crystal structure of the heat exchanger 100 were analyzed through an Electron BackScatter Diffraction (EBSD) test method.

Figure 10:
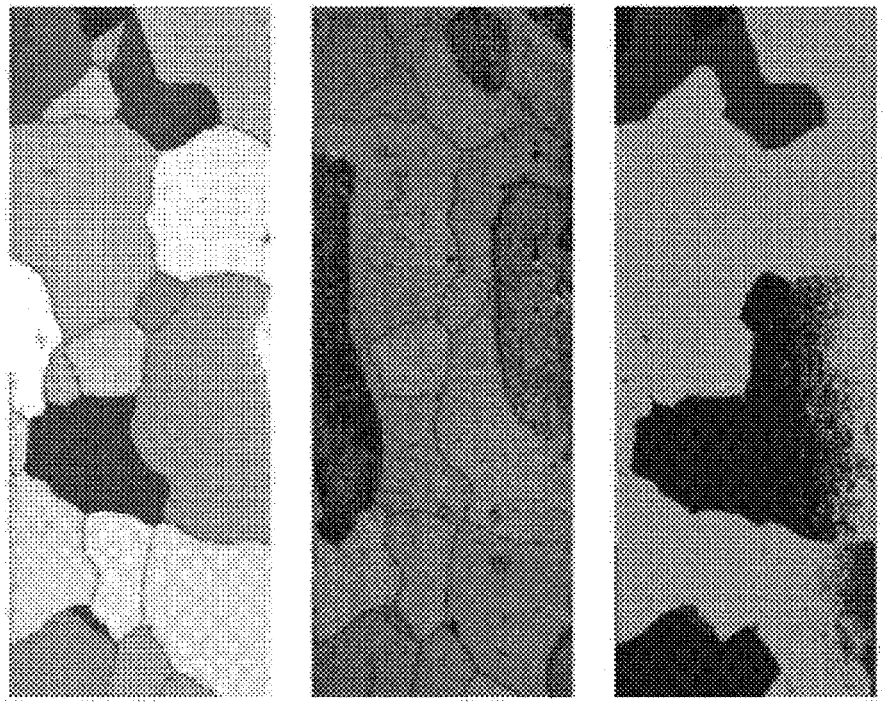
FIG. 10 is a photograph showing EBSD test results for the heat-exchange tube according to the present invention.
Figure 11:
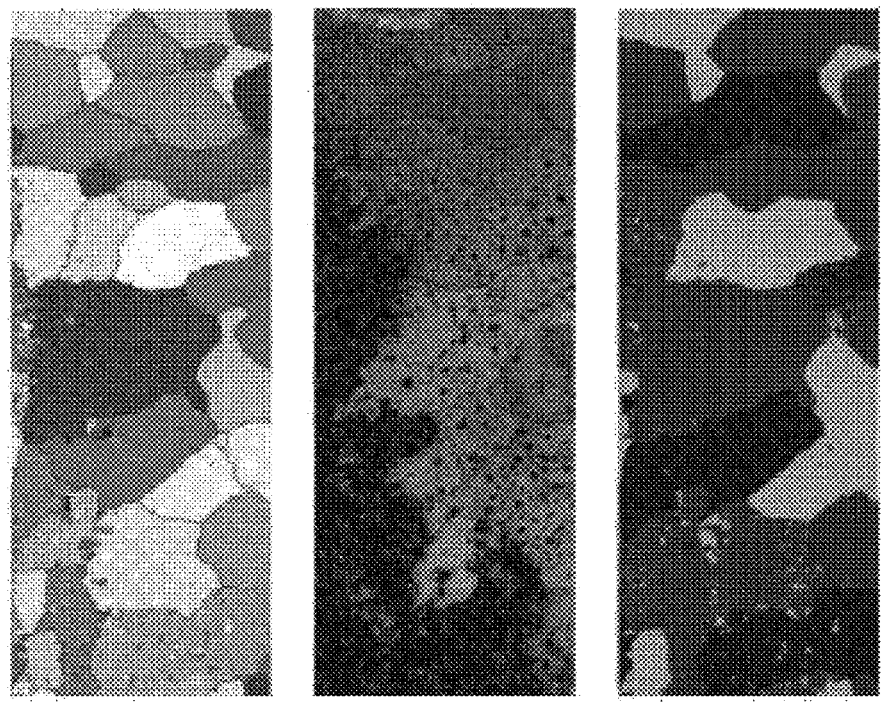
FIG. 11 is a photograph showing EBSD test results for the heat exchanger according to the present invention.

From the result of the EBSD test, it was found that the metal texture of the heat exchanger 100 is densely uniformly deformed, as illustrated in FIGS. 10 and 11. From this, it was found that the total strength and the durability are increased when the heat exchanger 100 is wound in a coil-spring shape.

Experimental Example 2: Corrosion Resistance Test for the Heat-Exchange Tube 110

For a SWAAT corrosion resistance test, the heat exchanger 100 having a coil-spring shape was used in an experimental group, whereas a flat-plate-shaped heat exchanger equipped with a pair of header pipes was used in a control group. Here, the heat-exchange tube 110 that was used in the heat exchanger was prepared so as to be of a microchannel type from an Al-3xxx series alloy.

For preparation of the conditions for the SWAAT (ASTM G85 Annex A3, Acidified Synthetic Sea Water (Fog) Test), glacial acetic acid was added to synthetic sea salt so as to set the concentration of salt water to 2.8-3.0 pH, and the test was performed under the conditions of a chamber temperature of 35±1° C., a supply pressure of a supplier of 0.7~1.8 kg/cm$^2$, a direct spray velocity of 1.0~2.0 ml/hr (80 cm$^2$), and repetition of a spray duration of 30 minutes and wetting for 90 minutes.

Figure 12:
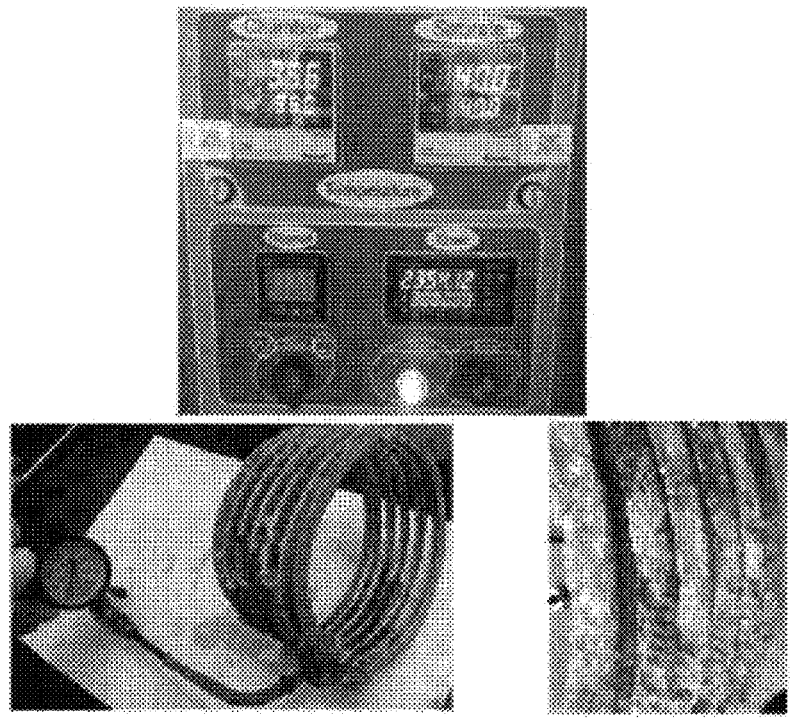
FIG. 12 is a photograph showing SWAAT rest results in an experimental group according to the present invention.
Figure 13:
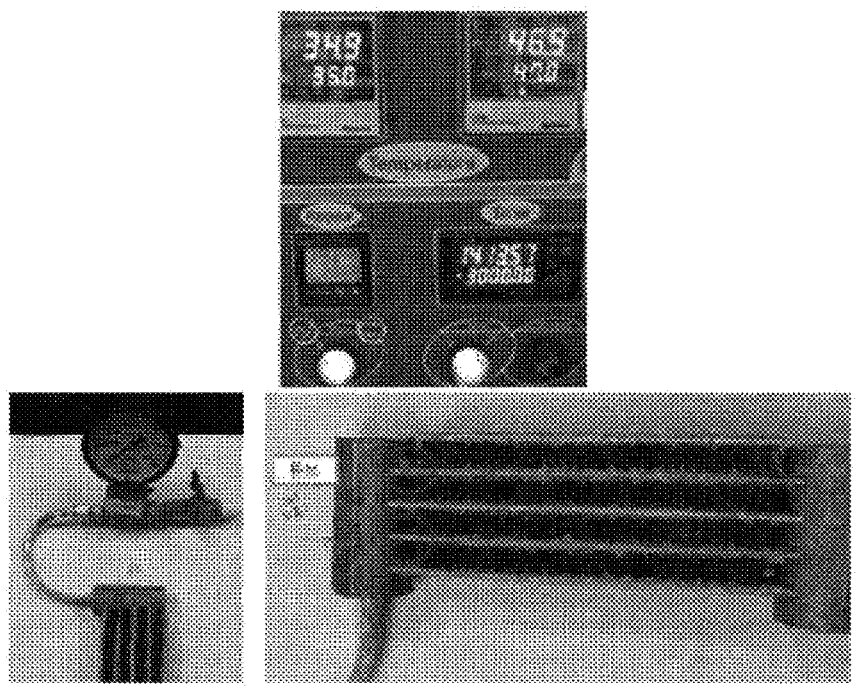
FIG. 13 is a photograph showing SWAAT rest results in a control group according to the present invention.

As a result of the SWAAT test, leakage was found to occur in the heat exchanger 100 wound in a coil-spring shape after 2354 hours, whereas leakage occurred in the flat-plate-shaped heat exchanger equipped with the pair of header pipes after 1413 hours, as illustrated in FIGS. 12 and 13. From this, it was found that corrosion resistance is increased merely by configuring the heat-exchange tube 110 into a cylindrical coil-spring shape, even without changing other conditions.

Experimental Example 3: Test for Efficiency of Heat Exchange

The heat exchanger 100 having a coil-spring shape was used in the experimental group, whereas a heat exchanger equipped with a pair of header pipes was used in a control group. The heat-exchange tube 110 that was used in the heat exchanger was prepared to be of a microchannel type from an Al-3xxx series alloy.

In particular, the heat exchanger 100 used in the experimental group, was prepared so as to have a volume of 50% of that in the control group. The test for efficiency of heat exchange was performed in such a manner as to measure the temperature of the refrigerant supplied to the heat exchanger 100 and the temperature of the refrigerant discharged from the heat exchanger 100 while changing the charging amount of the refrigerant.

TABLE 1

|  | Charging amount of refrigerant (g) | COND IN | COND OUT | Difference in temperature |
| --- | --- | --- | --- | --- |
| Experimental Group | 30 | 42.4 | 28.7 | 13.7 |
|  | 40 | 44.5 | 29.6 | 14.9 |
| Control Group (Volume of Ex. Group * 0.5) | 50 | 42.4 | 29.8 | 12.6 |
|  | 60 | 44.1 | 30.1 | 14 |

As a result of tests performed under the above conditions, it was found that the efficiency of heat exchange of the heat exchanger 100 having the coil-spring shape was excellent in that the heat exchanger 100, which was used in the experimental group, exhibits efficiency of heat exchange similar to that in the control group even though the charging amount of refrigerant was reduced to about half in the heat exchanger 100 in the experimental group, compared to the heat exchanger in the control group.

In addition, considering that the size of the heat exchanger in the experimental group is 50% that of the heat exchanger in the control group, it was found that efficiency of heat exchange of the heat exchanger 100 having the coil-spring shape was drastically increased, compared to the microchannel-type heat exchanger equipped with the pair of header pipes.

Accordingly, it was found that the total volume of the heat exchanger 100 having the coil-spring shape can be reduced and that the efficiency of heat exchange thereof can be increased.

The invention claimed is:

1. A microchannel-type aluminum heat exchanger comprising:
   a heat-exchange tube, which is wound in a coil-spring shape such that adjacent planar portions thereof face each other;
   a heat-exchange fin, which is repeatedly bent into a zigzag shape such that bent portions thereof are coupled to the adjacent planar portions of the heat-exchange tube,
   wherein the heat-exchange fin includes:
   a pair of first guide parts symmetrically formed on a surface region of the heat-exchange fin that is not coupled to the adjacent planar portion of the heat-exchange tube so as to guide air flows in opposite directions about a central line of the heat-exchange fin in a width direction; and
   a pair of second guide parts symmetrically formed on a surface region of the heat-exchange fin that is not coupled to the adjacent planar portion of the heat-exchange tube so as to guide air flows in opposite directions about a central line of the heat-exchange fin in a width direction, the pair of first guide portions and the pair of second guide portions being alternately arranged along a length of the heat-exchange fin,
   wherein the pair of first guide parts include a plurality of first guide units, which are symmetrically formed at first and second lateral sides of the heat-exchange fin about the central line of the heat-exchange fin, each of the plurality of first guide units including first guide plates, which are spaced apart from each other at regular intervals in the heat-exchange fin and are bent so as to be inclined, and first vent holes respectively formed through between the first guide plates,
   wherein the pair of second guide parts include a plurality of second guide units, which are symmetrically formed at first and second lateral sides of the heat-exchange fin about the central line of the heat-exchange fin, each of the plurality of second guide units including first guide plates, which are spaced apart from each other at regular intervals in the heat-exchange fin and are bent so as to be inclined, and second vent holes respectively formed through between the second guide plates,
   wherein the first guide plates of the pair of first guide parts, which are formed at the first and second lateral sides, and the second guide plates of the pair of second guide parts, which are formed at the first and second lateral sides, are symmetrically arranged about the central line but are asymmetrically arranged about a transverse direction such that, when the heat-exchange fin is bent in a zigzag shape, the first guide plates and the second guide plates, which are positioned at one of the first and second lateral sides, are inclined in the same direction so as to allow air to be introduced therethrough only in one direction, and the first guide plates and the second guide plates, which are positioned at the other of the first and second lateral sides, cause a direction in which the introduced air flows to be changed and cause the air to be discharged only in one direction.

2. The microchannel-type aluminum heat exchanger according to claim 1, wherein the bent portions of the heat-exchange fin are fused to the adjacent planar portions of the heat-exchange tube.

3. The microchannel-type aluminum heat exchanger according to claim 1, wherein the heat-exchange fin is bent so as to have a height T, which corresponds to a vertical distance between the adjacent planar portions of the heat-exchange tube.

* * * * *